United States Patent [19]

Ehrich et al.

[11] 4,189,116
[45] Feb. 19, 1980

[54] NAVIGATION SYSTEM

[75] Inventors: Ralph D. Ehrich, Reynoldsburg; Robert I. Emmert, Columbus, both of Ohio

[73] Assignee: Rockwell International Corporation, El Segundo, Calif.

[21] Appl. No.: 839,527

[22] Filed: Oct. 5, 1977

[51] Int. Cl.² .............................................. F42B 15/02
[52] U.S. Cl. .................................................. 244/3.16
[58] Field of Search ............................. 244/3.13, 3.16

[56] References Cited

U.S. PATENT DOCUMENTS

| | | | |
|---|---|---|---|
| 3,398,918 | 8/1968 | Girault | 244/3.13 |
| 3,640,628 | 2/1972 | Jones | 244/3.16 |
| 4,020,339 | 4/1977 | Gustafson | 244/3.13 |
| 4,021,007 | 5/1977 | Coxe | 244/3.13 |

Primary Examiner—Charles T. Jordan
Attorney, Agent, or Firm—L. Lee Humphries; H. Fredrick Hamann; Rolf M. Pitts

[57] ABSTRACT

This invention concerns a navigation system of the type utilizing proportional navigation guidance laws to guide an aerodynamically controlled body tracking a target, and particularly relates to a navigation system mechanization wherein necessary body-to-target line-of-sight rate-of-change information with respect to an inertial reference is developed implicitly, in part by using system optics and detector elements that are fixed to the guided body rather than to a body-mounted, inertially stabilized platform, to obtain stabilized guidance system tracking.

7 Claims, 4 Drawing Figures

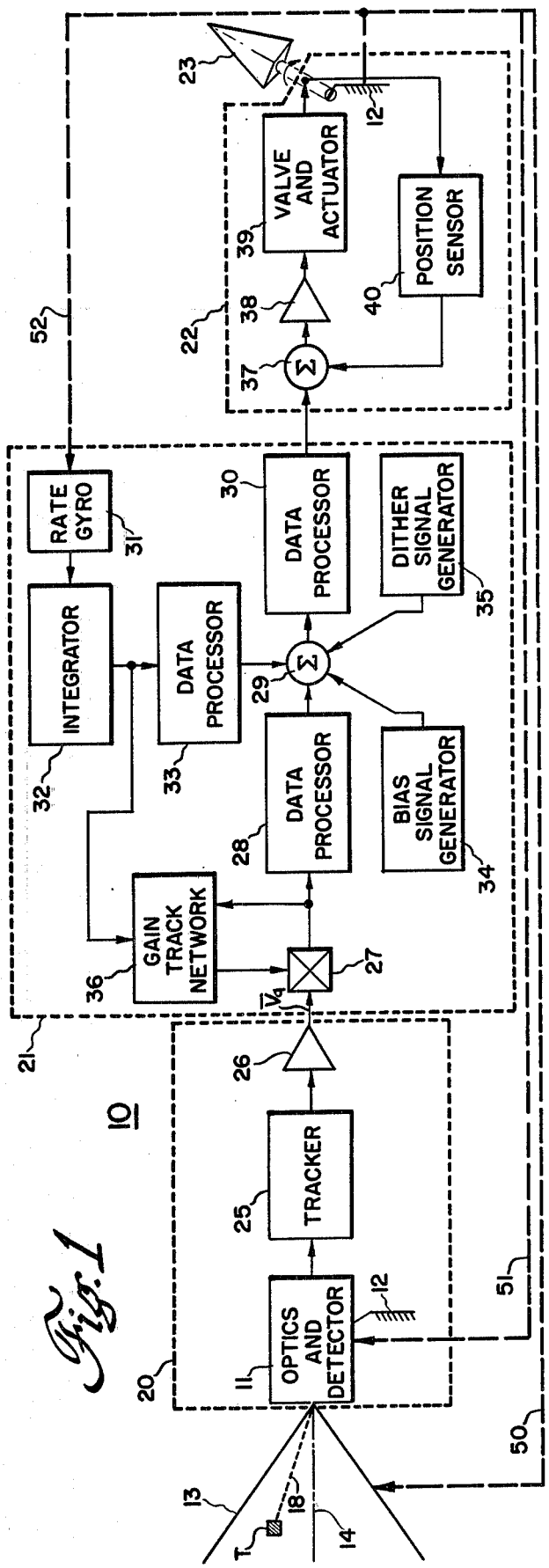
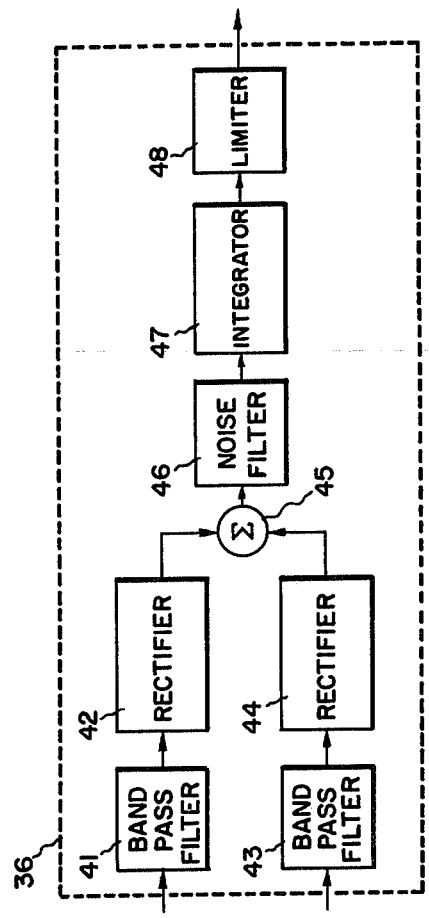
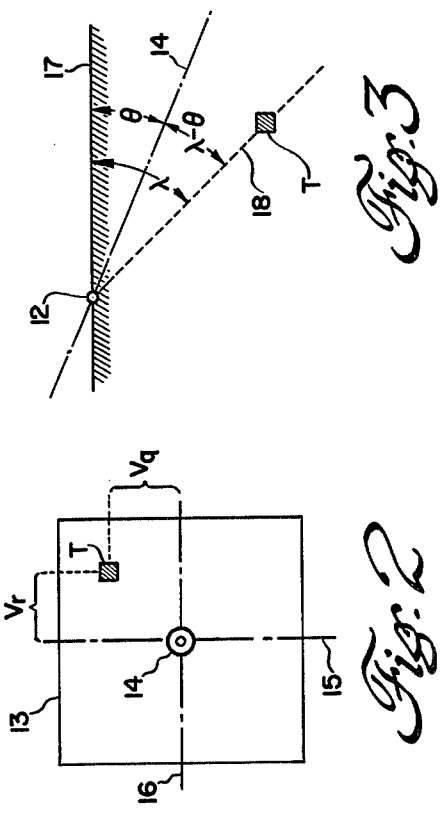
Fig. 1
Fig. 2
Fig. 3
Fig. 4

4,189,116

NAVIGATION SYSTEM

SUMMARY OF THE INVENTION

A guided body incorporating the navigation system of this invention is provided with a seeker section having state-of-the-art optics, detector, and tracker elements, with a conventional servo section having control surface, surface actuator, and actuator position feedback sensor elements, and also with a novel autopilot electronics section that controls servo section operation in response to tracking signals received from the system seeker section. The optics/detector element of the seeker section is mounted in fixed or "strapdown" relation to the body controlled by the system servo section control surface and actuator. The autopilot section includes sensor(s) that develop body pitch and/or yaw attitude rate of change information and that combine that information in suitable feedback form with the output of the system seeker section to develop actuator control in a manner that eliminates undesirable system linear tracking error sensitivity. The navigation system autopilot section sums a fractional part of the guided body integrated rate of attitude change information utilizing a combined gain track network and special scaling network to at least in part optimize system linear sensitivity reduction.

DESCRIPTION OF THE DRAWINGS

FIG. 1 is a schematic block diagram of a navigation system mechanization embodying the features of this invention;

FIG. 2 schematically illustrates typical displacement relationships of a selected target in the field of view of the FIG. 1 navigation system optics;

FIG. 3 graphically illustrates instantaneous angular orientation relationships of body tracking direction and system optics line-of-sight direction relative to a reference plane; and FIG. 4 is a schematic block diagram of the gain track network illustrated generally in FIG. 1.

DETAILED DESCRIPTION

FIG. 1 of the drawings schematically illustrates a guided system 10 having the features of this invention. System 10 includes conventional seeker section optics and detector 11 secured to guided body 12 in fixed or "strapdown" relationship, body 12 being controlled in flight orientation in accordance with known proportional navigation guidance laws. Element 11 may be in the form of a television camera sensor, for instance, with contrast detector circuits that function to identify the signature of a target T that is capable of being tracked. The optics portion of element 11 has a field of view 13 containing target T, such target being displaced at times either elevationally (in pitch) or directionally (in yaw), or both, from field of view center line 14. Center line 14 essentially corresponds to the longitudinal axis and instantaneous direction of flight of body 12 and typically coincides with the intersection of reference planes such as pitch (elevational) plane 15 and yaw (directional) plane 16. See FIG. 2. One such reference plane is designated 17 in later-discussed FIG. 3. The line-of-sight from system optics 11 to target T is designated 18. For simplicity, the subsequent description of the mechanization of system 10 is developed in relation to only a single reference plane such as a pitch plane 15. However, body 12 is typically guided or controlled relative to two orthogonal planes and therefore would normally utilize a separate autopilot and servo mechanization for the additional reference plane.

The major sections of system 10 include seeker section 20, electronics autopilot section 21, and servo section 22 which function together to control the actuation of pitch control surface 23 carried by body 12. No details with respect to the propulsion scheme for body 12 are shown in the drawings. The seeker section further includes, in addition to state-of-the-art optics and detector element 11, a conventional tracker element 25, and an amplifier 26. The output of tracker 25 is an electrical (electronic) tracking signal which in voltage is proportional to the pitch displacement $V_q$ (see FIG. 2) of target T relative to center line 14. Such tracker output signal is amplified at amplifier 26 and becomes $\overline{V}_q$, the signal which is inputted to autopilot electronics section 21.

Referring to FIG. 3, $\overline{V}_q$ is proportional to the difference between the line-of-sight angle $\lambda$ and the pitch attitude angle $\theta$. From FIGS. 1 through 3 it is also apparent that a line-of-sight signal useful in the implementation of a proportional navigation guidance law may be developed by adding a voltage proportional to the body pitch attitude angle $\theta$, for instance as measured by a body attitude gyroscope or by a pitch rate gyroscope with subsequent integration, to the voltage output $\overline{V}_q$ associated with strapdown seeker optics/detector 11 and tracker 25. Such pitch attitude signal is developed with appropriate compensation and the necessary summation is accomplished in the autopilot electronics section 21 disclosed in the drawings.

The autopilot electronics section 21 of system 10 which accomplishes the aforesaid addition objective is comprised of a multiplier element 27 effecting minimization of adverse seeker scaling factor variations, a digital data processor element 28 that provides desired phase lead compensation, a comparator element 29 which achieves the necessary summation of the target displacement signal and body attitude feedback signal, and a second digital data processor element 30 that provides the system with further desired phase lead compensation for the signal output from comparator 29. Data processor 28 typically has the transfer function form $(S/\omega_1+1)/(S/\omega_2+1)$; where $\omega_1$ is lower in frequency than $\omega_2$ in order to obtain desired phase lead compensation. Similarly, data processor 30 develops a transfer function of the form $(S/\omega_3+1)/(S/\omega_2+1)$; where $\omega_3$ is lower in frequency than $\omega_2$. The signal output of data processor 30 controls the operation of servo section 22 of the system.

In addition to the foregoing elements, autopilot electronics 21 further comprises a conventional pitch rate gyroscope 31, in combination with an integrator element 32 which integrates the output of rate gyro 31 to develop an attitude signal for the required feedback objective, and a data processor 33 that appropriately scales the output of integrator 32. Alternatively, an attitude gyroscope might be utilized in autopilot section 21 in lieu of the illustrated combination of elements 31 and 32.

Autopilot section 21 further includes a gravity bias signal generator 34, a dither signal generator 35, and gain track network 36 in combination with the above-described elements disclosed in FIG. 1. Bias signal generator 34 is included in the mechanization of system 10 to provide for gravitational compensation relative to motion in a pitch plane. In embodiments operating to control body motion, in a yaw plane, however, bias for gravitational forces is not necessary. Dither signal generator 35 is utilized in system 10 to develop improved system stability, particularly in connection with an attempt to minimize scale factor variations. Such signal generators normally are arranged to provide their inputs to comparator circuit 29 for summation with the output signals from data processors 28 and 33. In addition, gain track network 36 compares the amplitude of dither-originated signal generator 35 and adjusts the gain to be applied to multiplier 27 so that the amplitude of the dither at the output of multiplier 27 is equal to the amplitude of the dither signal outputted by integrator 32.

Further details with regard to gain track network 36 are developed in connection with the illustration of FIG. 4.

The principal elements of conventional servo section 22 include comparator 37, amplifier 38, and the conventional valve and actuator element 39 which responds to the output of amplifier 38 and which controls the rotation of body control surface 23. Valve and actuator element 39 is of conventional construction and in most instances is either a pneumatic or hydraulic actuator device controlled by an electrically operated bi-directional valve. Section 22 further includes feedback position sensor (transducer) 40 which closes the servo loop of section 22 and provides a feedback information signal from control surface 23 to comparator module 37 in a conventional manner.

Gain track network 36 is an electronic servo designed to adjust the amplitude of the signals outputted by amplifier 26 until such signals are equal to those outputted by integrator 32. Such is accomplished by including a band pass filter 41 and rectifier 42 for the input signals from integrator 32 and a band pass filter 43 and rectifier 44 for the input signals from multiplier 27. Such filters are normally each centered about the system dither frequency established by element 35 and attenuate low frequencies associated with line-of-sight rate signals. The outputs of rectifiers 42 and 44 are combined at comparator element 45 and subsequently subjected to noise filtering by filter 46. An integrator 47 and limiter 48 are provided in gain track network 36 to further develop the proper equalization of gain developed by network 36.

During operation of system 10 seeker 20 detects target T in field of view 13 and processes the target signature such that tracker 25 tracks the target position producing voltage outputs representing displacement of the target from center 14 of field of view 13. The pitch plane tracker, for instance, will have a voltage output proportional to the vertical displacement of the target from the center of the field of view ($V_q$). This voltage is proportional to the difference between the line-of-sight angle ($\lambda$) and the instantaneous pitch attitude ($\theta$). $V_q = K(\lambda - \theta)$, where K is a scale factor. $V_q$ is amplified at element 26 becoming $\overline{V}_q$ and is the strapdown seeker output. $\overline{V}_q = K_q(\lambda - \theta)$, where $K_q$ is a scale factor (volts/degree).

$\overline{V}_q$ is multiplied at multiplier 27 by the output, $K_o$, of the gain track circuit 36. The input to data processor 28 is $\overline{V}_q K_o = K_o K_q (\lambda - \theta)$. The purpose of processor 28 is to provide electrical phase lead compensation, to "speed-up" body response to the operation of system 10. A zero ($\omega_1$) counteracts the low frequency pole that appears in the flight path dynamics. As previously mentioned, processor 28 provides the transfer function form $(S/\omega_1 + 1)/(S/\omega_2 + 1)$; where $\omega_1$ is lower in frequency than $\omega_2$ in order to obtain phase lead.

The output of processor 28 is compared to the output of processor 33 (with proper sign). The input to processor 33 is integrated body pitch rate or pitch attitude. An attitude gyro can be used in place of the rate gyro 31 and integrator 32. Processor 33, as previously noted, is also a phase lead network with a transfer function of the form $(S/\omega_3 + 1)/(S/\omega_2 + 1)$ where $\omega_3$ is lower in frequency than $\omega_2$. The voltage output of processor 33 is scaled to be $V_g = 0.75 K_g \theta$. The outputs of the processors 28 and 33 are compared in the summer 29 yielding $K_o K_q (\lambda - \theta) + 0.75 K_g \theta$ as the low frequency input to processor 30. Simplifying, the input to processor 30 becomes $K_o K_q \lambda + (0.75 K_g - K_o K_q) \theta$. The action of the gain track circuit 36 is to make $K_o K_q = K_g$. Thus, the low frequency input to processor 30 becomes $K_g \lambda - 0.25 K_g \theta$. The integrating action of the aerodynamics of body 12 may require that $\dot{\theta} = 0$ in steady state (low frequencies). Thus, $K_g \lambda - 0.25 K_g \theta = 0$ in steady state, and $\theta / \lambda = \dot{\theta} / \dot{\lambda} = 4$. This is the relationship of proportional navigation, with a navigation gain of 4 as is required for accurate terminal homing.

Electrical data processor 30 can either be a phase lead or phase lag network, but is typically a phase lead network for loop stability. The output of processor 30 commands a control surface position from the pitch actuator servo 22. A change in surface position (23) causes a rotation of the body 12, producing pitch rate ($\dot{\theta}$).

The body motion is fed back through three paths. The outer path 50 is through the flight path dynamics and geometry, is heavily filtered and is a function of time-to-go until impact. This outer loop 50 is denoted the homing loop and has single order poles in the body geometry and flight path dynamics. The single order pole in the geometry is "non-minimum phase", and is inversely proportional to time-to-go. The flight path pole is a function of dynamic pressure and the body aerodynamics, typically varying from 0.2 to 2 radians per second.

The feedback of missile motion through the two inner paths 51 and 52 (but discounting the gain track circuit 36) is very fast. One path, 51, is through the seeker as body motion changes the target position instantaneously in the field of view. As mentioned previously the seeker output is proportional to $\lambda - \theta$, where $\lambda$ is slowly varying through the outer homing loop 50 and $\theta$ varies at higher frequencies through the inner loop converting body motion to target motion in the seeker field of view 13. The feedback path of body motion through seeker 20 is a negative feedback path. This means that as $\theta$ increases, the actuator servo 22 moves the aerodynamic control surface to reduce the amplitude of $\theta$.

The other "inner" feedback path 52 is through rate gyro 31, integrator 32, and data processor 33. This path provides positive feedback. This means that as $\theta$ increases, actuator servo 22 moves the aerodynamic control surface 23 to increase the amplitude of $\theta$ and the system diverges.

The two inner paths 51 and 52 are summed in the system to create one "effective" negative feedback path, since the rate gyro path 52 is preferaby scaled to be 0.75 of that of path 51 through the seeker. Instability problems can result if the seeker linearity changes such that the positive path dominates the negative path. However, the concept of implicit proportional navigation embodied in this invention, is less sensitive to seeker gain variations since only 0.75 of the positive path is fed back compared to the conventional process used to derive line-of-sight rate information explicitly with a positive feedback path of unity.

In order to further desensitize system gain variation problems and thereby control navigation gain, the track network 36 was added to system 10. Such gain track element multiplies the seeker output with a factor such that the signal that is the data processor 28 input equals the signal at data processor 33 input at the frequency used for dither in the system. The 0.75 scale factor in the positive feedback path is contained in data processor 33.

A sinusoidal dither signal is added to the input to data processor 30 and its frequency is sufficiently high (on the order of 20 radians per second) so that it is heavily filtered in outer feedback path 50 and does not influence the line-of-sight angle (λ) until the time-to-go is so short that body 12 cannot effectively respond. Thus, the dither signal appears primarily in the two inner feedback loops 51 and 52 and can be used to adjust tracking gain with the gain track element 36. Gain track network 36 is an electronic servo that requires the signal inputs to bandpass filters 41 and 43 be equal.

The gain track network 36 inputs are first injected into bandpass filters 41 and 43, which are tuned to the dither frequency produced by generator 35, and finally comprised of a derivative and quadratic poles with damping typically on the order of 0.2. Bandpass filters 41 and 43 are, respectively, followed by full wave rectifiers 42 and 44 that demodulate the signals carried by the dither frequency. The rectifier outputs then have low frequency components proportional to the amplitudes of the filter 41, 43 inputs at the dither frequency. The two rectifier signals are differenced at comparator 45 and passed through a low pass noise filter 46. Noise filter 46 has quadratic poles set at the dither frequency, with a damping of unity. This effectively eliminates the second harmonic of the dither frequency created by the full wave rectification process. The noise filter output then is proportional to the error, if any, that exists between the inputs to elements 41 and 43. This error proportion is fed to an integrator 47 which integrates until the error between the signals is zero. The limiter 48 on the integrator output bounds the gain $K_o$ to only positive values with an upper limit. This prevents possible large transients during the system start-up process.

The concept of implicit proportional navigation has reduced the sensitivity of system 10 to seeker and gyro sensor variations which variations would otherwise be expensive to overcome, by enabling the compensation functions of processors 28 and 33 to be accurately produced with inexpensive electronic circuits, such as a digital microprocessor.

We claim:

1. A proportional-type terminal guidance control system for on-board use on an aerodynamically-controlled vehicle for guiding the vehicle toward a target, said target being on a line of sight emanating from the vehicle and displaced angularly relative to the direction of flight of the vehicle, said system comprising
    (a) optical detector means adapted to be mounted in fixed relation to a vehicle for viewing a target about a line of sight for producing a detection signal indicative of the signature of the target,
    (b) tracker means responsive to said detection signal for producing a tracking signal indicative of the angular displacement of said line of sight relative to the vehicle,
    (c) dithering autopilot means responsive to said tracking signal for producing a control signal for dithering and changing the direction of flight of the vehicle relative to said line of sight according to proportional navigation laws, and
    (d) servo means receiving said control signal from said autopilot means and for actuating a control furface that changes the direction of flight of the dithered vehicle relative to said line of sight,
said autopilot means including a first feedback loop which employs a vehicle attitude aignal proportional to the dithered flight attitude of the vehicle relative to a reference plane and further including gain control means for combining said attitude signal with said gain-scaled tracking signal as a gain control signalfor adjusting the gain of said gain-scaled tracking signal, said gain-adjusted tracking signal being further combined into said autopilot means control signal in accordance with laws of proportional navigation to thereby increase the flight path stability of the vehicle.

2. The system defined by claim 1 wherein said autopilot means includes rate gyroscope means producing a rate of change signal proportional to the rate of change of body orientation relative to a reference plane and integrator means producing said body attitude signal from said rate gyroscope means rate of change signal.

3. The system defined by claim 1 wherein said autopilots means includes attitude gyroscope means producing said body attitude signal.

4. A navigation system for a body moved along a direction of flight toward a target on a line of sight emanating from the body and displaced angularly relative to said direction of flight, comprising
    (a) optics and detector means adapted to be mounted in fixed relation to the body for viewing the target along the line of sight and producing a detection signal indicative of the signature of the target,
    (b) tracker means receiving said detection signal from said optics and detector means and producing a tracking signal proportional in magnitude to the angular displacement of the line of sight relative to the body,
    (c) autopilot means receiving said tracking signal from said tracker means and producing a control signal for changing the direction of flight of the body relative to the line of sight according to proportional navigation laws, and
    (d) servo means receiving said control signal from said autopilot means for actuating a control surface that changes the direction of flight of the body relative to the line of sight,
said autopilot means including a feedback loop which generates a body attitude signal proportional to the angular displacement of the body relative to a reference plane, said body attitude signal being combined into said autopilot means control signal in accordance with laws of proportional navigation to thereby increase the stability of said body in flight and wherein said autopilot means includes a comparator element functioning to sum system feedback loops, said system feedback loops including a first inner path wherein motion feedback through the body and said optics and detector means is processed to produce a first feedback signal to said comparator element equal to said body attitude signal, and a second inner path wherein motion feedback through said autopilot means is processed to produce a second feedback signal to said comparator element which is approximately 0.75 the value of said first feedback signal.

5. The system of claim 4 wherein said autopilot means includes generator means producing a body dither signal, said body dither signal being summed with said feedback loop signals at said comparator element.

6. The system of claim 5 wherein said autopilot means includes a gain track circuit means utilizing the body dither signal to adjust circuit electronic gains to enhance body stability and maintain the proper navigation gain for body motion along said direction of flight toward a target.

7. The system of claim 4 wherein said reference plane is a pitch plane and said autopilot means includes generator means producing a pitch bias signal, said pitch bias signal being summed with said feedback loop signals at said comparator element.

* * * * *